United States Patent
Viswanathan et al.

(10) Patent No.: US 10,803,187 B2
(45) Date of Patent: Oct. 13, 2020

(54) COMPUTERIZED METHODS AND SYSTEMS FOR IMPLEMENTING ACCESS CONTROL TO TIME SERIES DATA

(71) Applicant: ORACLE INTERNATIONAL CORPORATION, Redwood Shores, CA (US)

(72) Inventors: Ganesh Viswanathan, Issaquah, WA (US); Prashant L. Sarma, Bellevue, WA (US); Heng Zhe Duan, Bellevue, WA (US); Mykyta Synytskyy, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 302 days.

(21) Appl. No.: 15/851,801

(22) Filed: Dec. 22, 2017

(65) Prior Publication Data

US 2019/0197246 A1  Jun. 27, 2019

(51) Int. Cl.
*G06F 21/00* (2013.01)
*G06F 21/60* (2013.01)
*G06F 21/62* (2013.01)
*G06F 16/28* (2019.01)
*G06F 16/22* (2019.01)
(Continued)

(52) U.S. Cl.
CPC ........ *G06F 21/604* (2013.01); *G06F 16/2228* (2019.01); *G06F 16/2477* (2019.01); *G06F 16/24568* (2019.01); *G06F 16/285* (2019.01); *G06F 16/9537* (2019.01); *G06F 21/62* (2013.01); *G06F 21/6218* (2013.01); *G06F 21/6227* (2013.01)

(58) Field of Classification Search
CPC ........ G06F 21/60; G06F 21/604; G06F 21/62; G06F 21/6209; G06F 21/6218; G06F 21/6227; G06F 21/6236; G06F 21/6245; G06F 21/645
See application file for complete search history.

(56) References Cited

U.S. PATENT DOCUMENTS

| | | | |
|---|---|---|---|
| 2016/0334998 A1* | 11/2016 | George | G06F 3/0608 |
| 2017/0185797 A1* | 6/2017 | Valine | G06F 21/552 |
| 2019/0116170 A1* | 4/2019 | Reddipalli | H04L 63/083 |

OTHER PUBLICATIONS

Amazon Web Services, Inc., Using Identity-Based Policies (IAM Policies) for Cloudwatch; 2017; pp. 1-5; downloaded from: http://docs.aws.amazon.com/AmazonCloudWatch/latest/monitoring/iam-identity-based-access-control-cw.html.

(Continued)

*Primary Examiner* — Edward Zee
(74) *Attorney, Agent, or Firm* — Kraguljac Law Group, LLC

(57) ABSTRACT

Systems, methods, and other embodiments associated with implementing access control to time series data are described. In one embodiment, a method includes associating streams of time series data to a group and assigning the group to an access control container. The example method may also include defining an access policy specifying access control rules for authorizing access to the time series data. The example method may also include receiving a request from a requestor to access the time series data of the group through the access control container. The example method may also include executing the access control rules within the access policy to either deny the request or allow implementation of the request.

20 Claims, 12 Drawing Sheets

(51) Int. Cl.
*G06F 16/2455* (2019.01)
*G06F 16/2458* (2019.01)
*G06F 16/9537* (2019.01)

(56) References Cited

OTHER PUBLICATIONS

Google Cloud, Access Control Guide; pp. 1-5; downloaded on Nov. 14, 2017 from: https://cloud.google.com/monitoring/access-control.

* cited by examiner

COMPUTERIZED METHODS AND SYSTEMS FOR IMPLEMENTING ACCESS CONTROL TO TIME SERIES DATA

BACKGROUND

Many computing environments, such as enterprise software platforms and cloud computing environments hosting multi-tenant services, utilize numerous resources in order to provide services to users. For example, the computing environment may employ compute hosts such as servers to execute services, network devices to facilitate communication between compute hosts and between compute hosts and client devices, storage devices, etc. The computing environment may provide billing services, payroll services, storage services, inventory tracking services, e-commerce services, application creation and execution services, etc. Each user may have a tenancy with the computing environment. A tenancy can represent a user account of a tenant with the computing environment. The tenancy can specify what services are subscribed to by the tenant, what commands and actions are allowed to be performed by the tenant such as the creation of a new virtual machine, what resources are assigned to the tenant, etc. Thus, a client device of the tenant can connect to the computing environment and log into the tenancy in order to access data of the tenant and services subscribed to through the tenancy.

A telemetry service of the computing environment is configured to monitor the heath and operation of services, applications, devices, and/or other resources within the computing environment. Over time, the telemetry service collects large amounts of time series data, such as metrics, logs, and other hierarchically structured data collected over time. The time series data has values and timestamps associated with the values. A timestamp specifies a time at which a value or multiple values are collected/measured. The values can relate to metrics such as read/write operations per second, processor utilization, service runtime, network latency, storage device utilization, etc. The telemetry service can process the time series data in order to present analytical views of the time series data to users, such as graphs, event timelines, interfaces to search and discover metrics, etc.

Managing access to time series data is complex and often impractical due to the complexity of time series data. Such complexities occur because time series data can be defined across a long time range, such as months or years. Time series data is also complex due to the amount of time series data that is collected and stored, such as where millions of metrics for many types of resources are collected. Also, time series data is complex because of the sheer number of different tenants with different access rights, subscriptions, and data within the computing environment. Issues that arise when managing access to time series data can relate to how to apply access policies to resources that exist over long time ranges such as years of collected time series data, how to revoke permission on a metric stream (e.g., should a user still be allowed to access metrics created before the permission is revoked), how to grant write permission, etc.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that provide for implementing access control to time series data. A computing environment, such as cloud computing environment hosting multi-tenant computing services, employs various resources such as compute nodes, network devices, and storage devices to provide tenants with access to services and data. A telemetry service monitors the resources to collect time series data, such as metrics and logs of values and timestamps of when such values were collected. The values can correspond to process utilization, storage utilization, network latency, service runtime, etc. Due to the complex nature of time series data being collected over long periods of time from numerous different types of resources that can be associated with particular tenants, implementing access control for the time series data is difficult and can be unfeasible. An impractical amount of storage and processing resources would be required to store each metric within a database, along with additional database entries specifying what tenants, users, or other entities have access to each individual metric because millions of metrics are collected over time and hundreds of thousands of tenants may use the cloud computing environment.

As will be described herein, in one embodiment, a security module is implemented within the computing environment to control access of users (tenants) to time series data. In particular, rules are used to group certain streams of time series data collected from particular resources into groups. In one embodiment, a rule specifies that time series data from a particular network device and storage device are to be collected into a group. The group is assigned to an access policy specifying access control rules for authorizing particular users, services, applications, and/or devices access to certain time series data associated with the group. In one embodiment, a first user is provided with read access to a certain time range of the time series data, a second user is provided with read and write access to a different time range of the time series data, and a particular service is provided with write access to write time series data to the group. The access policy is associated with an access control container to which the group is assigned. The access control container corresponds to a tenancy (an account) of a tenant with the computing environment. In this way, requests to access the time series data of the group through the access control container are either denied or allowed based upon the execution of the access control rules within the access policy.

Figure 1:
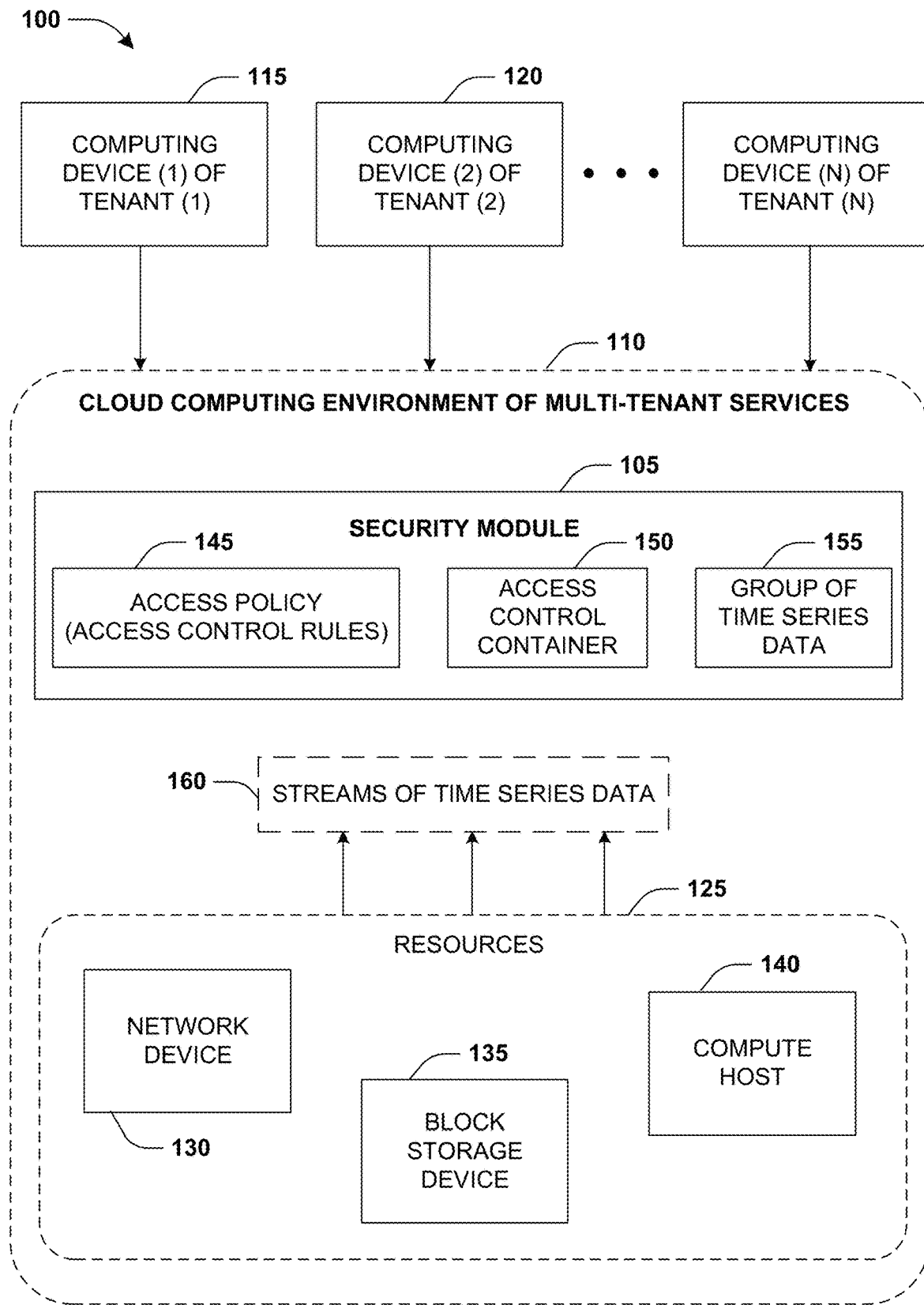
FIG. 1 illustrates an embodiment of a system associated with implementing access control to time series data.

With reference to FIG. 1, one embodiment of a computer system 100 associated with implementing access control to time series data is illustrated. The computer system 100 includes a security module 105, which can be configured to execute on one or more computers, such as computer 615 of FIG. 6 and/or other computers. The implementing of access control policies may be implemented for a cloud computing environment 110 of multi-tenant services, such as storage services, website hosting services, application creation and execution services, etc. A tenant, such as a user, company, service, application, or other entity, may create a tenancy, such as an account, with the cloud computing environment 110. The tenant can subscribe to services provided by the cloud computing environment 110 through the tenancy. An access control container 150 is used to represent the tenancy, such as to store login credentials of the tenant, identify what services and resources are subscribed to by the tenant, identify where data of the tenant is stored, etc. In this way, tenants can connect to the cloud computing environment 110 to access services, such as a first computing device 115 of a first tenant and a second computing device 120 of a second tenant accessing the cloud computing environment 110.

A telemetry module of the cloud computing environment 110 collects streams of time series data 160 from resources 125 of the cloud computing environment 110, such as from a network device 130, a block storage device 135, a compute host 140, etc. The streams of time series data 160 may be collected continuously or periodically over a time period such as a day, a month, a year, or indefinitely. Time series data comprises one or more values associated with a timestamp, such as a processor load value associated with a timestamp of a time at which the processor load value was collected. Tenants, such as users, services, applications, etc. may request access to certain types of time series data over certain timespans, such as processor load of the compute host 140. Accordingly, the security module 105 associates one or more of the streams of time series data 160 to a group 155 based upon a rule specifying what resources 125 are to be monitored for metrics and logs of time series data that will be made available through the group 155. The rule may be defined by the tenant requesting access to such time series data or may be programmatically generated. In one embodiment, a rule can include regular expressions that help filter a list of resources or time series data such as metrics or logs that are added to the group 155.

The security module 105 assigns the group 155 into which the time series data is collected to the access control container 150 of the tenant requesting access to the time series data. The security module 105 creates an access policy 145 specifying access control rules for authorizing access to the time series data associated with the group 155. The access control rules can specify what users, services, applications, or other entities associated with the tenant or the cloud computing environment 110 are allowed read access, write access, and/or read/write access to certain time series data or certain time ranges of time series data within the group 155. The security module 105 associates the access policy 145 to the access control container 150 representing the tenancy (user account) of the tenant with the cloud computing environment 110. In this way, when a request is received from a requestor to access time series data within the group 155, the security module 105 determines whether to allow or deny the request based upon the access control rules within the access policy 145.

Figure 2:
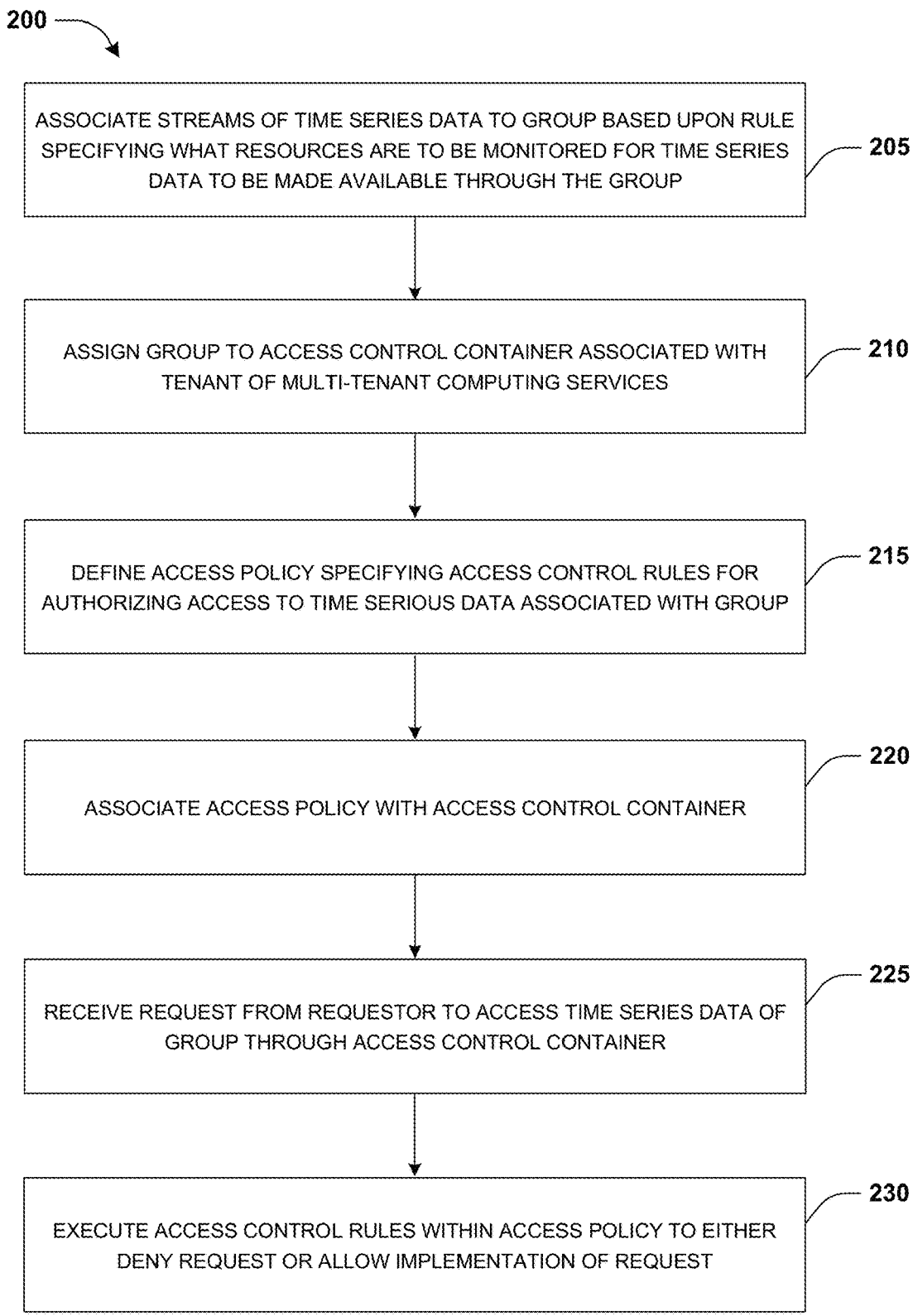
FIG. 2 illustrates an embodiment of a method associated with implementing access control to time series data.

With reference to FIG. 2, one embodiment of a computer implemented method 200 associated with implementing access control to time series data is illustrated. In one embodiment, the method 200 is performed by the security module 105 utilizing various computing resources of the computer 615 and/or other computers, such as the processor 620 for executing instructions associated with defining access policies, determining whether to deny or allow requests to time series data, etc. Memory 635 and/or disks 655 are used for storing access policies, time series data, and/or other data. Network hardware is used for communicating data structures and/or other data between the computer 615 and remote computers over a network, such as for receiving requests from tenants for access to time series data. The method 200 is triggered upon a request to implement access control for time series data.

Figure 4A:
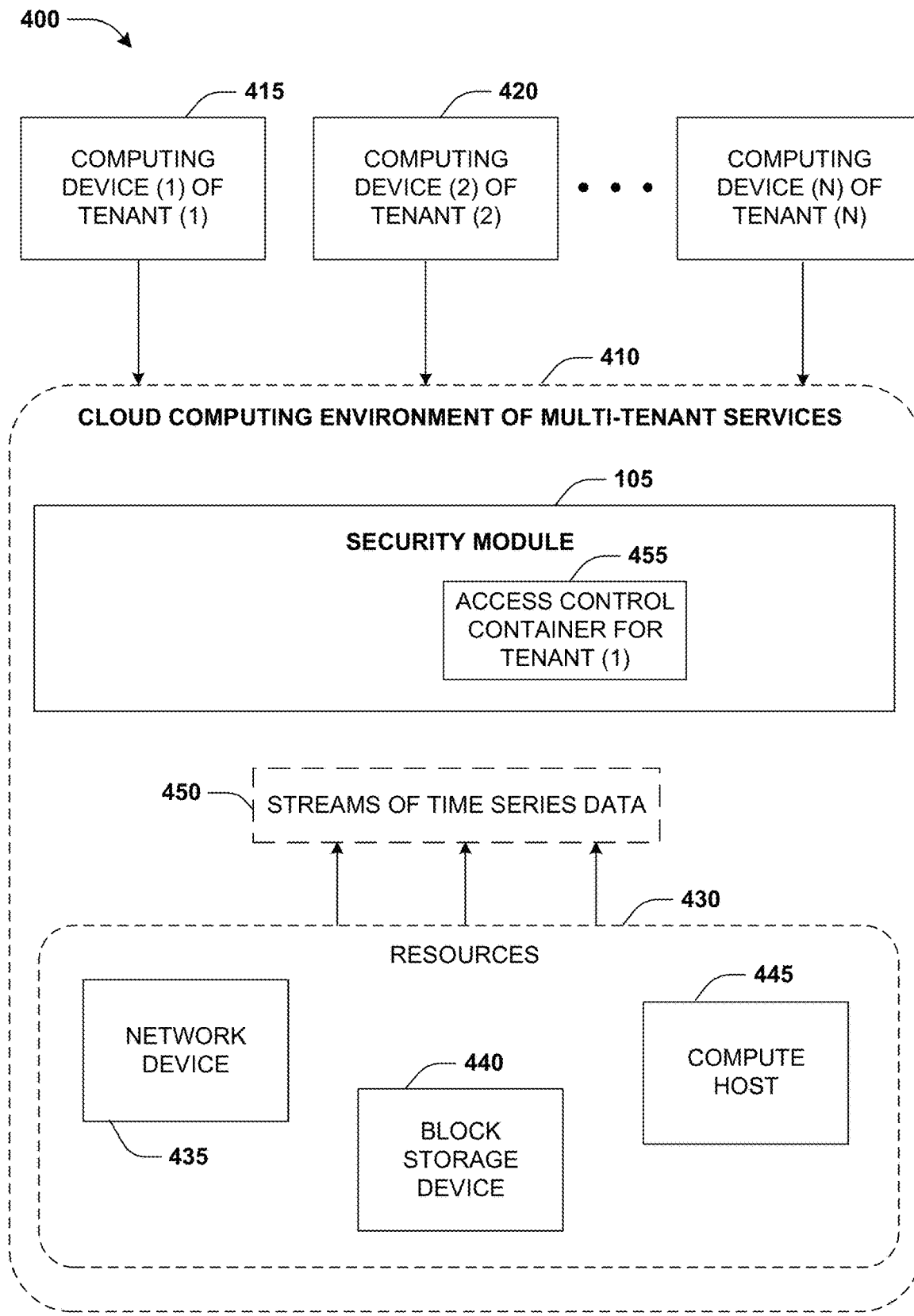
FIG. 4A illustrates an embodiment of a system associated with implementing access control to time series data, where streams of time series data are established with resources of a cloud computing environment.

The security module 105, configured to implement the method 200, is associated with a cloud computing environment 410 that provides multi-tenant services using resources 430, such as a network device 435, a block storage device 440, a compute host 445, etc., as illustrated by example system 400 of FIG. 4A. Computing devices of tenants having tenancies such as user accounts with subscriptions to multi-tenant services can connect to the cloud computing environment 410 to execute such services. In one embodiment, a first computing device 415 of a first tenant, a second computing device 420 of a second tenant, and/or other computing devices of other tenants can connect to the cloud computing environment 410. In one embodiment, a tenancy of the first tenant (a user account with the cloud computing environment 410) is represented by an access control container 455 for the first tenant. The access control container 455 specifies login credentials, where data of the first tenant is stored, what services are subscribed to by the first tenant, what resources are assigned to the first tenant, what actions/commands can be performed by the first tenant such as the right to instantiate a new compute host, etc. In another embodiment, a compartment of the first tenant is represented by the access control container 455, and thus access policies can be defined at a compartment level. If the first tenant has multiple compartments, then multiple access control containers 455 may be associated with the first tenant for each compartment.

A telemetry service associated with the cloud computing environment 410 collects metric and log data over time from resources 430 used by multi-tenant computing services hosted by the cloud computing environment. The metric and log data is collected as time series data through streams of time series data 450. A stream of time series data corresponds to the telemetry service collecting values and timestamps of such values from a particular resource, such as storage capacity values collected from a storage device every 5 minutes. Agent modules can be deployed within the cloud computing environment 410 such as at each resource in order to stream/transmit values and timestamps of when such values were collected to the telemetry service.

Figure 4B:
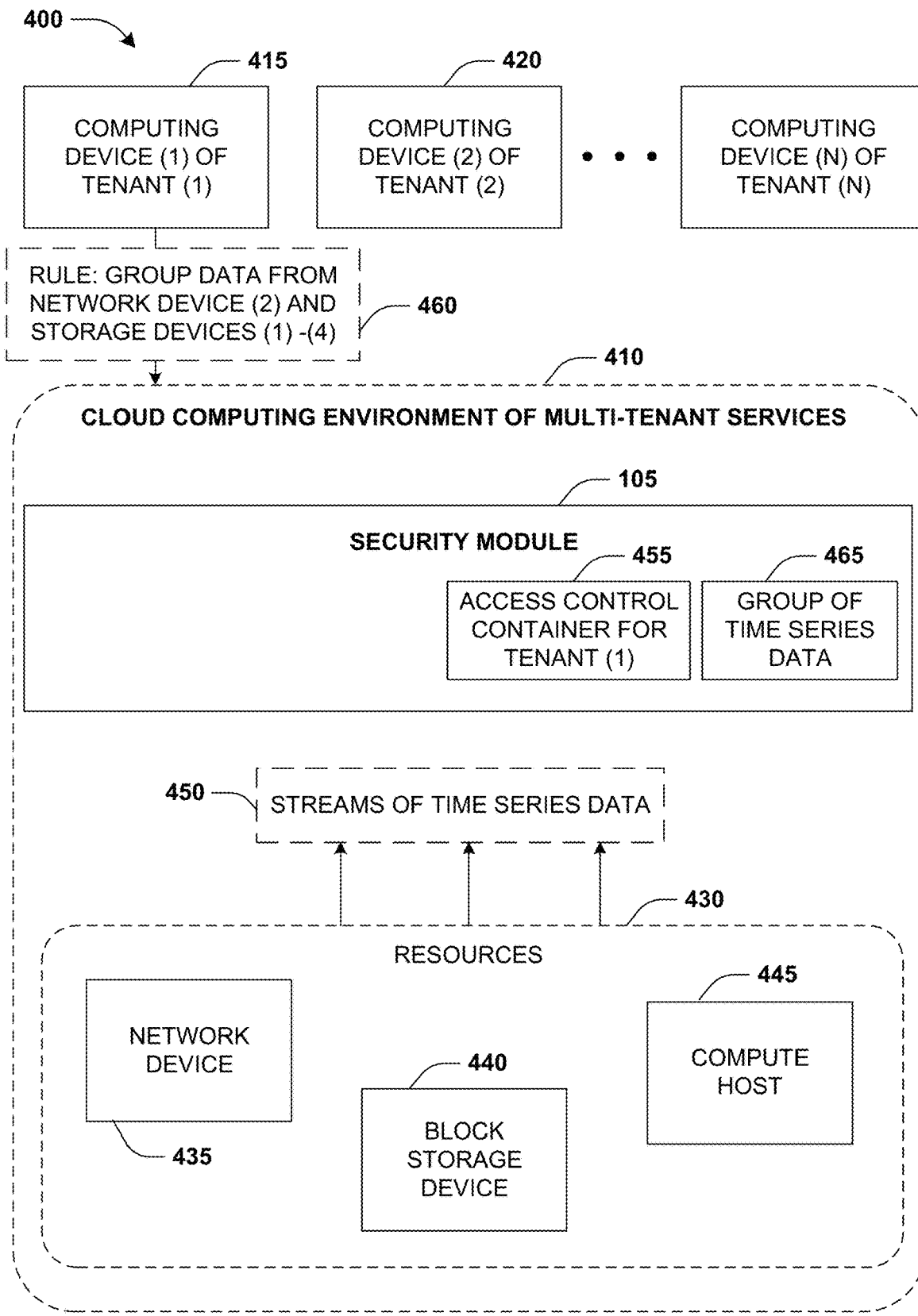
FIG. 4B illustrates an embodiment of a system associated with implementing access control to time series data, where a rule is used to group time series data.

The first tenant may have an interest in monitoring certain resources within the cloud computing environment, such as storage utilization of storage devices assigned to the first tenant and network latency of network devices through which the first tenant accesses services and data from the cloud computing environment 410. Accordingly, the security module 105 receives a rule 460 from the first computing device 415 of the first tenant, as illustrated by FIG. 4B. The rule 460 specifies what resources the first tenant wants to monitor, such as logs and metrics from a second network device and from four storage devices. The security module 105 identifies one or more streams of time series associated with the resources specified within the rule 460.

At 205, the security module associates one or more streams of the streams of time series data 450 to a group 465 through which time series data of the resources will be made available to the first tenant. In one embodiment, a stream of network latency values and corresponding timestamps from the second network device is assigned to the group 465. Streams of storage capacities values and corresponding timestamps from the four storage devices are assigned to the group 465. In one embodiment, different types of time series data can be aggregated to create an aggregate type of time series data that is assigned to the group 465, such as where memory utilization values and timestamps and processor utilization values and timestamps of a particular compute host are aggregated together so that access control can be implemented for the aggregate type of time series data. In one embodiment, the group 465 is a data structure or data container into which the time series data is stored. In another embodiment, the group 465 specifies a relationship of the time series data (e.g., stored in a database) to the group 465 and first tenant, and thus the group 465 does not actually comprise the time series data. Various implementations of the group 465 are contemplated. In one embodiment, the group 465 can identify a collection of time series data using regular expressions on identifiers of time series data or tagged information about the time series data such as tags added as metadata to the time series data.

At 210, the group 465 is assigned to the access control container 455 representing the tenancy of the first tenant or a compartment of the tenancy. This assignment is recorded within a data structure, which will be later described in conjunction with FIG. 3. At 215, an access policy 475 specifying access control rules for authorizing access to the time series data associated with the group 465 is created, as illustrated by FIG. 4C. In one embodiment, the security module 105 receives a definition 470 of the access policy 475 from the first computing device 415 of the first tenant. In another embodiment, the security module 105 programmatically defines the access policy 475 based upon various security rules, and ownership rules, resource allocations to tenants, and policies of the cloud computing environment 410 and/or specified through the access control container 455.

An access control rule can specify what services, applications, users, or other entities are allowed to read certain time series data within the group 465. In one embodiment, a first user of the tenancy may be allowed to read both processor utilization values and memory utilization values, and that a second user of the tenancy may be allowed to read only the processor utilization values. An access control rule can specify what services, applications, users, or other entities are allowed to write time series data to the group 465. An access control rule can restrict read and/or write access to a particular time range of a type of time series data, such as restricting access for a user to a particular date range of time stamped processor utilization values within the group 465. The date range may correspond to a date range that already occurred in the past, a date range that has not yet occurred, a date range that spans a current date, etc. At 220, the access policy is associated with the access control container 455 to associate the access policy with the tenancy of the first tenant. The association may be stored within a data structure.

Figure 3:
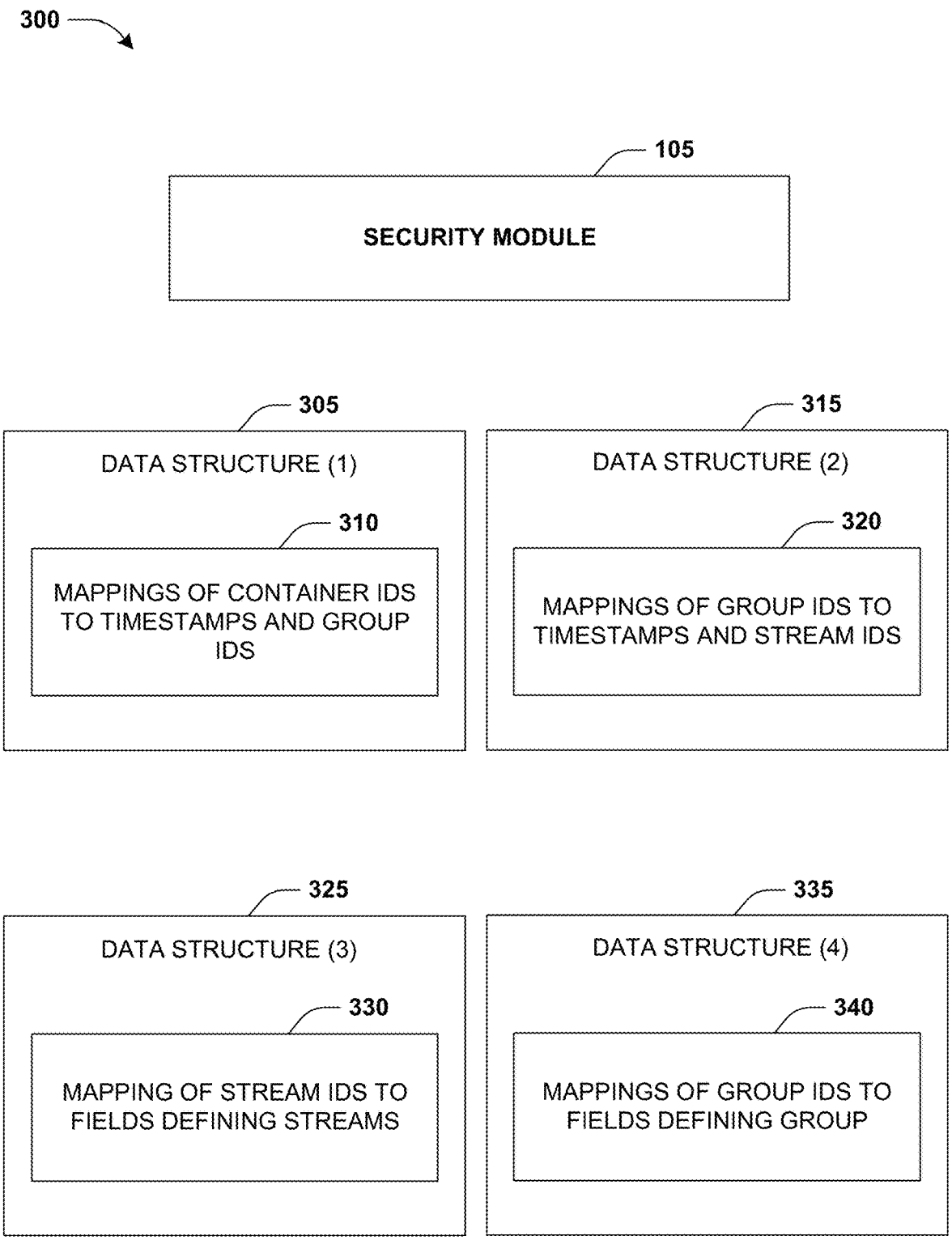
FIG. 3 illustrates an embodiment of data structures used to implement access control to time series data.
Figure 4C:
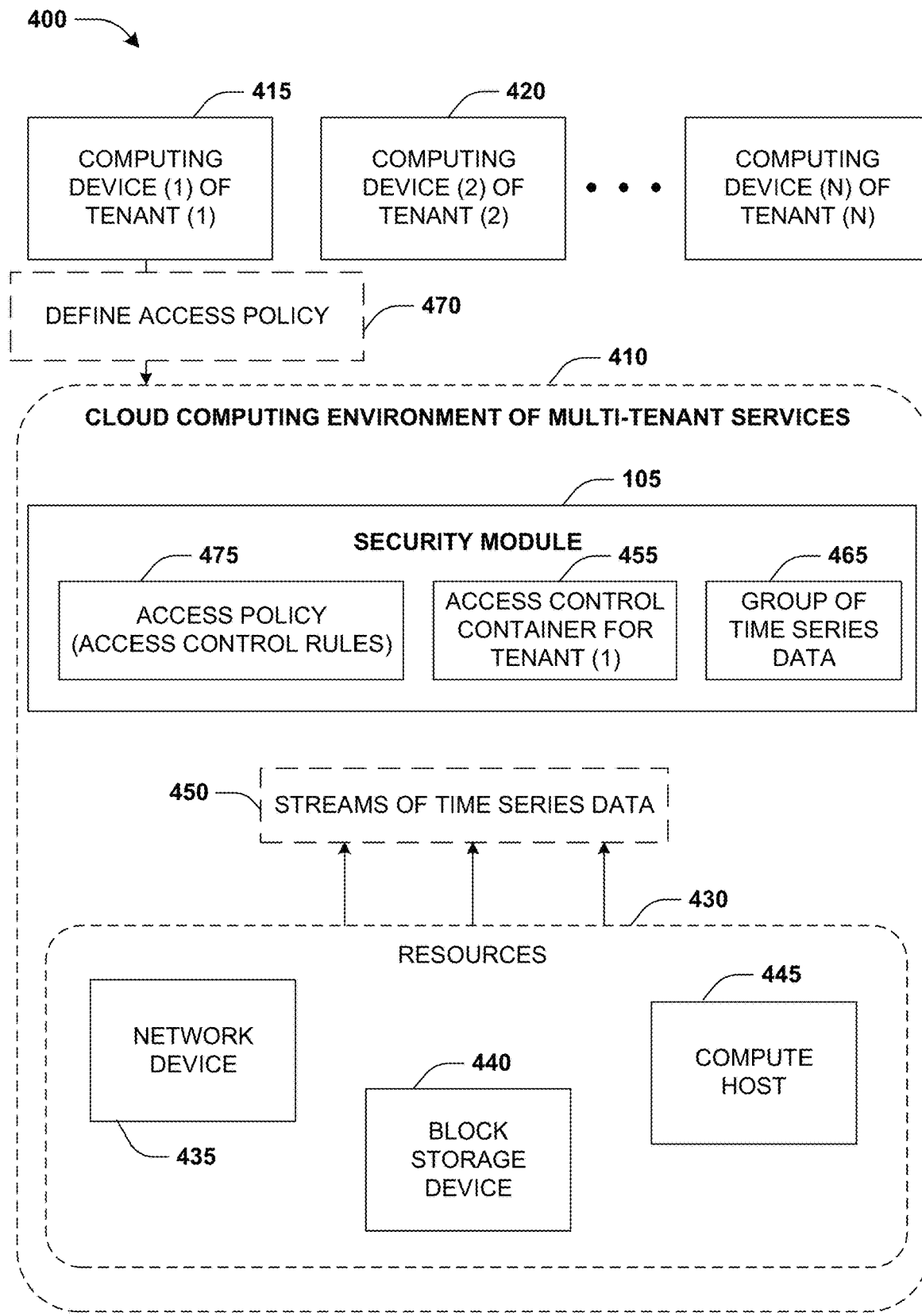
FIG. 4C illustrates an embodiment of a system associated with implementing access control to time series data, where an access policy is defined.

The security module 105 utilizes various data structures, such as tables within a database, to track associations between streams of time series data, groups of time series data, access control containers, and access policies in order to implement access policies for providing access to time series data, as illustrated by example 300 of FIG. 3. The security module 105 maintains a first data structure 305 with mappings 310 that map container identifiers of access control containers to timestamps and group identifiers of groups. In one embodiment, a mapping would map a container identifier of the access control container 455 for the first tenant to a timestamp and a group identifier of the group 465 into which time series data will be grouped and/or stored.

The security module 105 maintains a second data structure 315 with mappings 320 that map group identifiers of groups of time series data to timestamps and stream identifiers of streams of time series data associated to respective groups. In one embodiment, a mapping would map a group identifier of the group 465 to a timestamp and stream identifiers of the streams of time series data that are associated to the group 465, such as streams of values from the second network device and the four storage devices.

The security module 105 maintains a third data structure 325 with mappings 330 that map stream identifiers of streams of time series data to fields defining respective streams. A field can comprise a metric name of a type of metric received through a stream (e.g., a storage capacity metric), a namespace of a source providing the stream such as a storage device namespace, a tenant identifier of the first tenant associated with the access control container 455 to which the group 465 and the access policy 475 are assigned, and a dimension used to tag metrics received through the stream. A dimension can be a tenant defined tag used to label a particular metric or type of metric.

The security module 105 maintains a fourth data structure 335 with mappings 340 that map group identifiers of groups of time series data to fields defining respective groups. In one embodiment, a mapping would map a group identifier of the group 465 to fields defining the group 465, such as a display name for the group 465 and a description of the group 465. The display name and/or description may be user defined or may be derived from names of the resources being monitored, names of the types of metrics and/or logs assigned to the group 465, information about the first tenant and/or the tenancy of the first tenant, etc.

The security module 105 utilizes these data structures to assign and enforce access policies on access control containers of tenants of the cloud computing environment 410. The security module 105 defines and stores definitions of access policies, access control rules, groups of time series data, etc. within these data structures. Thus, when a request to access time series data is received, the security module 105 can query the data structures to determine what group, access policy, access control rules, and access control container are to be used to evaluate whether to allow or deny the request.

Access policies can be defined and executed at various levels within the cloud computing environment 410. In one embodiment, access control rules within the access policy 475 are executed at a tenant level of a multi-tenant computing service hosted by the cloud computing environment 410. The access policy 475 can be applied to one or more tenants to control access of the one or more tenants to the group 465 of time series data. In another embodiment, the access control rules within the access policy 475 are executed at a compartment level of the multi-tenant computing service hosted by the cloud computing environment 410. A tenant can be associated with one or more compartments, and thus the access policy 475 can be implemented at a granularity smaller than a tenancy. The tenant can associate particular resources with particular compartments for grouping such time series data from the resources, and then assign access policies to each compartment in order to control access to time series data of respective resources assigned to each compartment.

Figure 4D:
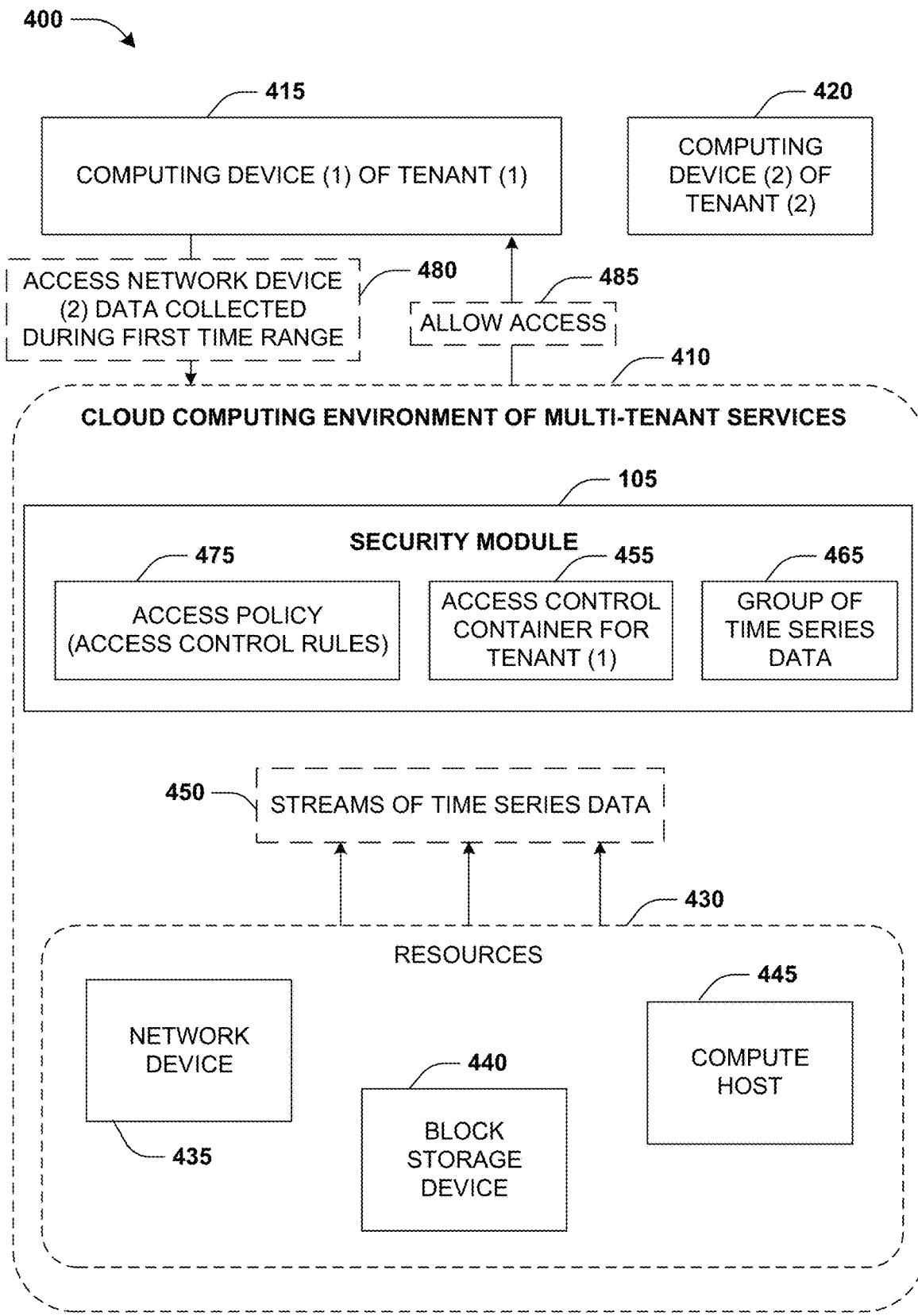
FIG. 4D illustrates an embodiment of a system associated with implementing access control to time series data, where access is granted to time series data.

At 225, a request 480 for access to time series data of the group 465 is received from a requestor through the access control container 455, such as from the first computing device 415 of the first tenant, as illustrated by FIG. 4D. In one embodiment, the request 480 could be to read a particular value collected at a particular timestamped time, such as a network latency value collected at a particular time. In another embodiment, the request 480 could be to read a particular range of values collected over a time period, such as network latency values collected over the past 4 days. In another embodiment, the request 480 could be to write/put a value and timestamp to the group 465, such as by an agent module collecting time series data from a resource. In one example, the request 480 is to access metrics collected from the second network device during a first time range, such as the past week.

At 230, the security module 105 executes the access control rules within the access policy 475 to either deny or allow implementation of the request 480. In one embodiment, the access control rules specify that the first tenant has access to read values collected from the second network device during the first time range. Accordingly, the security module 105 allows 485 implementation of the request 480.

Figure 4E:
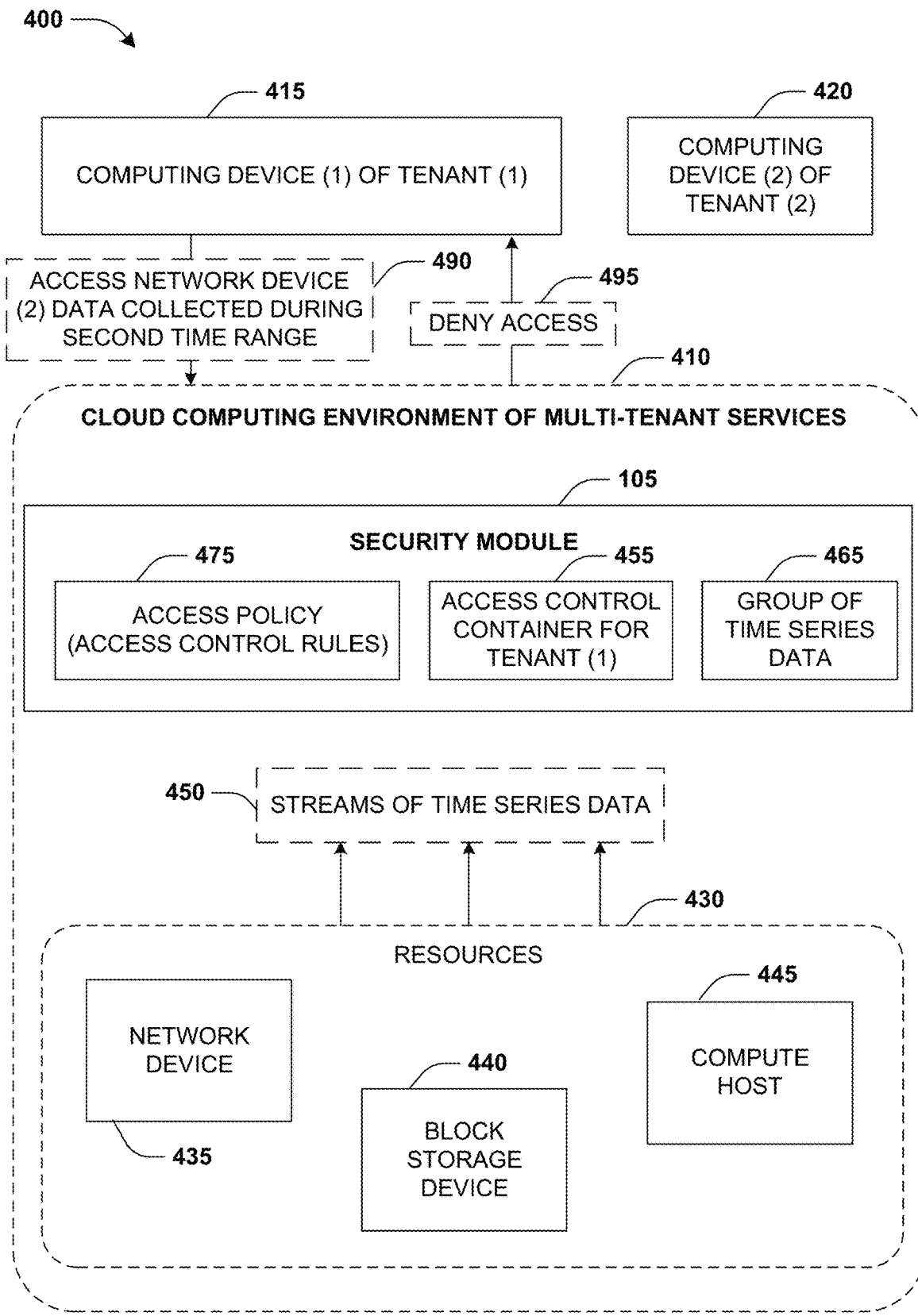
FIG. 4E illustrates an embodiment of a system associated with implementing access control to time series data, where access is granted to time series data.

A second request 490 may be received by the security module 105 from the first computing device 415, as illustrated by FIG. 4E. The security module 105 executes the access control rules within the access policy 475 to either deny or allow implementation of the request 490. In one embodiment, the access control rules specify that the first tenant does not have access to read values collected from the second network device during the second time range. Accordingly, the security module 105 denied 495 implementation of the second request 490.

Various types of access control rules can be executed to implement access control to the time series data within the group 465. In one embodiment, an access control rule restricts read access to a first time range of the time series data from a particular resource and allows read access to a second time range of the time series data from that resource. In another embodiment, an access control rule restricts write access to a third time range of the time series data from the resource and allows writes access to a fourth time range of the time series data from the resource. In another embodiment, an access control rule provides read access to time series data of the group 465 for time series data having timestamps following creation of the group 465. Access to time series data collected before creation of the group 465 may be restricted or allowed by the access control rule. In another embodiment, an access control rule provides read access to time series data of the group 465 for time series data having timestamps following a time at which the access policy 475 was defined to provide the read access. In this way, various types of access control rules are used to provide access to particular time ranges of data. In another embodiment, write access to the time series data of the group 465 may be revoked, such as through an access control rule.

In one embodiment, the access policy 475 can be remapped between compartments of the first tenant and/or remapped between tenants/tenancies. The access policy 475 can be remapped from a first compartment to a second compartment. A first mapping of the access policy to the first compartment can be retain, such as where access is still provided to the first compartment to particular time series data of the group 465. Otherwise, the first mapping can be removed.

Figure 5:
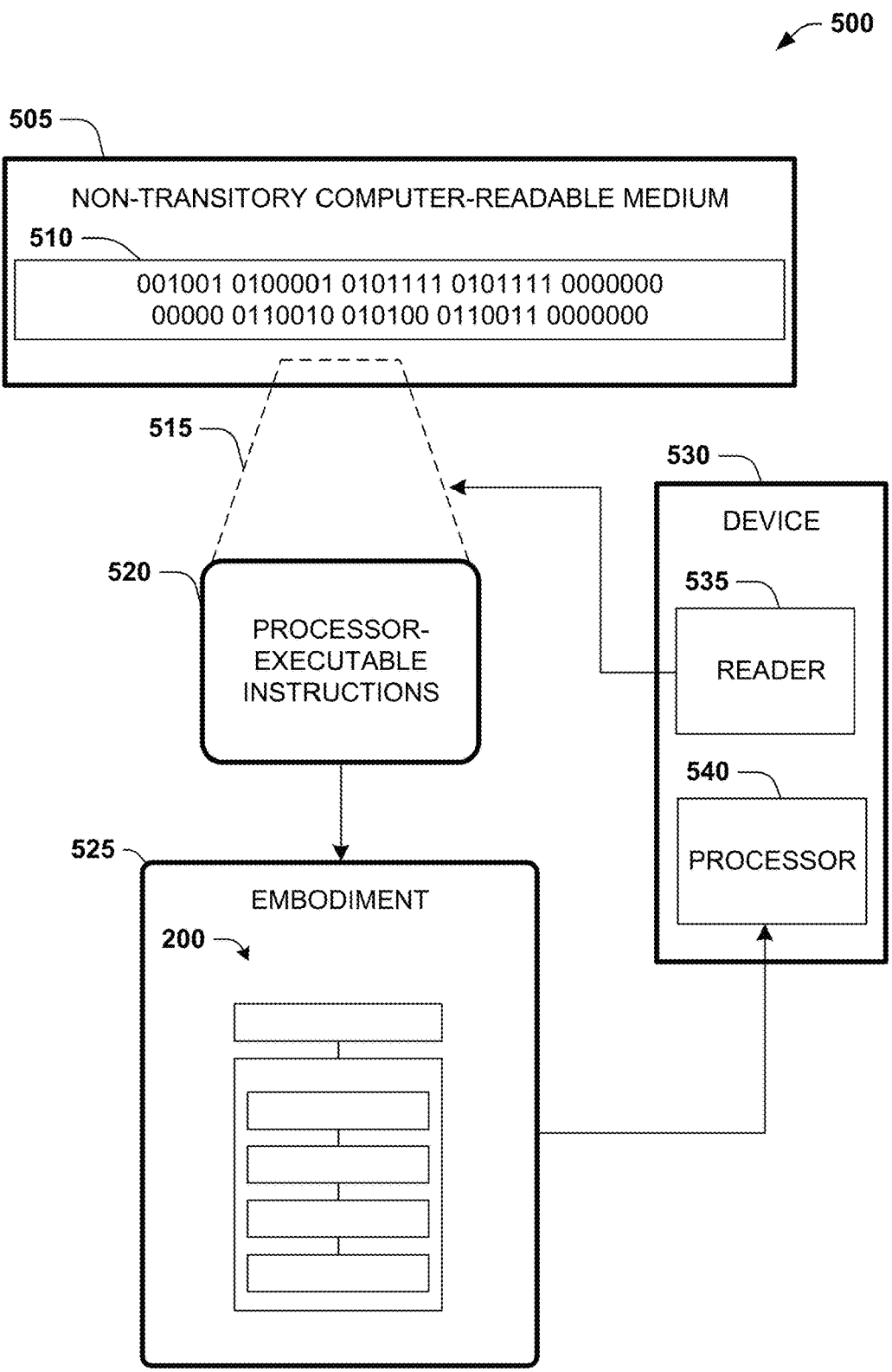
FIG. 5 illustrates an embodiment of a non-transitory computer-readable medium.

FIG. 5 is an illustration of a scenario 500 involving an example non-transitory computer-readable medium 505. In one embodiment, one or more of the components described herein are configured as program modules, such as the security module 105, stored in the non-transitory computer-readable medium 505. The program modules are configured with stored instructions, such as processor-executable instructions 520, that when executed by at least a processor, such as processor 540, cause the computing device to perform the corresponding function(s) as described herein. In one embodiment, the, functionality of the security module 105, stored in the non-transitory computer-readable medium 505, may be executed by the processor 540 as the processor-executable instructions 520 to perform an embodiment 525 of the method 200 of FIG. 2.

The non-transitory computer-readable medium 505 includes the processor-executable instructions 520 that when executed by a processor 540 cause performance of at least some of the provisions herein. The non-transitory computer-readable medium 505 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 505 stores computer-readable data 510 that, when subjected to reading 515 by a reader 535 of a device 530 (e.g., a read head of a hard disk drive, or a read operation invoked on a solid-state storage device), express the processor-executable instructions 520.

In some embodiments, the processor-executable instructions 520, when executed cause performance of operations, such as at least some of the example method 200 of FIG. 2, for example. In some embodiments, the processor-executable instructions 520 are configured to cause implementation of a system, such as at least some of the example system 100 of FIG. 1, for example.

Figure 6:
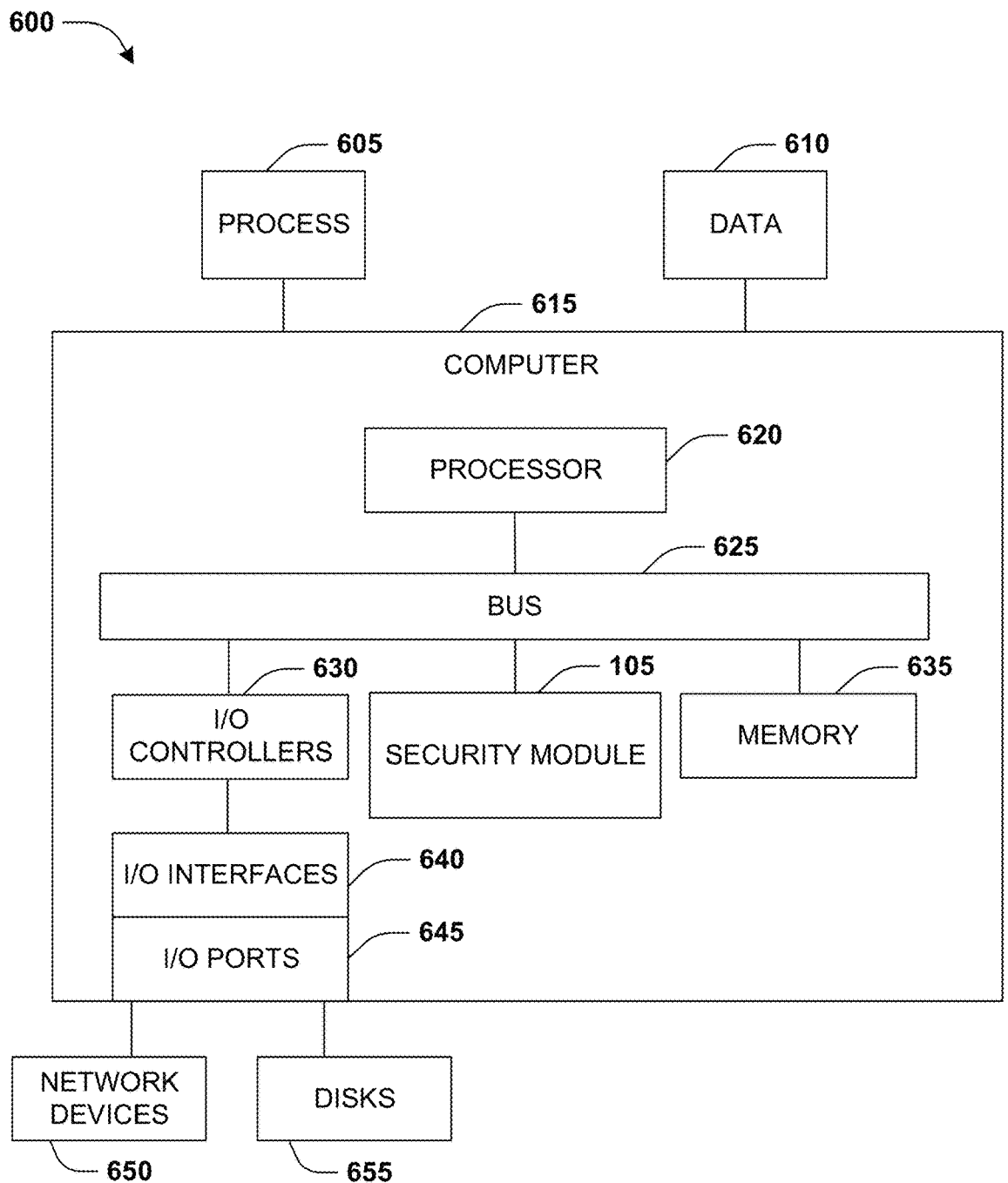
FIG. 6 illustrates an embodiment of a computing system configured with the example systems and/or methods disclosed.

FIG. 6 illustrates an example computing device 600 that is configured and/or programmed with one or more of the example systems and methods described herein, and/or equivalents. The example computing device 600 may be the computer 615 that includes a processor 620, a memory 635, and I/O ports 645 operably connected by a bus 625. In one embodiment, the, the computer 615 may include logic of the security module 105 configured to facilitate the system 100 and/or the method 200 shown in FIGS. 1-2. In different embodiments, the logic of the security module 105 may be implemented in hardware, a non-transitory computer-readable medium 605 with stored instructions, firmware, and/or combinations thereof. While the logic of the security module 105 is illustrated as a hardware component attached to the bus 625, it is to be appreciated that in other embodiments, the logic of the security module 105 could be implemented in the processor 620, stored in memory 635, or stored in disk 655.

In one embodiment, logic of the security module 105 or the computer 615 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 615 as data 610 that are temporarily stored in memory 635 and then executed by processor 620.

The logic of the security module 105 may also provide means (e.g., hardware, non-transitory computer-readable medium 605 that stores executable instructions, firmware) for performing rule based source sequencing for allocation.

Generally describing an example configuration of the computer 615, the processor 620 may be a variety of various processors including dual microprocessor and other multi-processor architectures. The memory 635 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 655 may be operably connected to the computer 615 via, for example, the I/O interface 640 (e.g., card, device) and the I/O ports 645. The disks 655 may be, for example, a magnetic disk drive, a solid state disk drive, a floppy disk drive, a tape drive, a Zip drive, a flash memory card, a memory stick, and so on. Furthermore, the disks 655 may be a CD-ROM drive, a CD-R drive, a CD-RW drive, a DVD ROM, and so on. The memory 635 can store a process, such as within the non-transitory computer-readable medium 605, and/or data 610, for example. The disk 655 and/or the memory 635 can store an operating system that controls and allocates resources of the computer 615.

The computer 615 may interact with input/output (I/O) devices via the I/O interfaces 640 and the I/O ports 645. The I/O devices may be, for example, a keyboard, a microphone, a pointing and selection device, cameras, video cards, displays, the disks 655, the network devices 650, and so on. The I/O ports 645 may include, for example, serial ports, parallel ports, and USB ports. I/O controllers 630 may connect the I/O interfaces 640 to the bus 625.

The computer 615 can operate in a network environment and thus may be connected to the network devices 650 via the I/O interfaces 640, and/or the I/O ports 645. Through the network devices 650, the computer 615 may interact with a network. Through the network, the computer 615 may be logically connected to remote computers (e.g., the computer 615 may reside within a distributed computing environment to which clients may connect). Networks with which the computer 615 may interact include, but are not limited to, a local area network (LAN), a new area network (WAN), and other networks.

Figure 7:
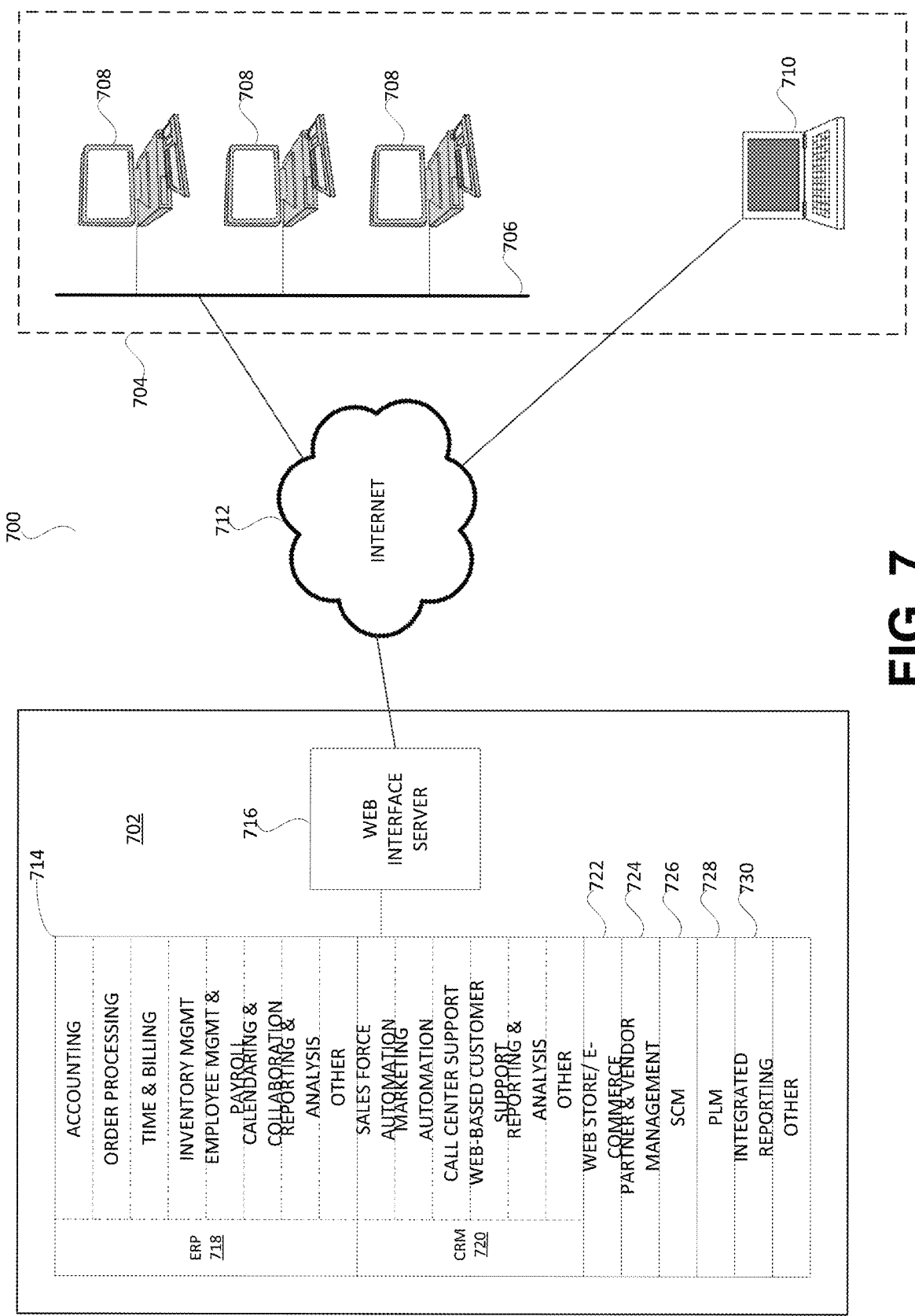
FIG. 7 illustrates an embodiment of an integrated business system and an enterprise network in which an embodiment of the invention may be implemented.

FIG. 7 is a diagram illustrating a system 700 in which an embodiment of the invention may be implemented. Enterprise network 704 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 704 is represented by an on-site local area network 706 to which a plurality of personal computers 708 are connected, each generally dedicated to a particular end user, such as a service agent or other employee (although such dedication is not required), along with an exemplary remote user computer 710 that can be, for example, a laptop computer or tablet computer of a traveling employee having internet access through a public Wi-Fi access point, or other internet access method. The end users (consumers) associated with computers 708 and 710 may possess an internet-enabled smartphone or other electronic device (such as a PDA, tablet, laptop computer) having wireless internet access or other synchronization capabilities. Users of the enterprise network 704 interface with the integrated business system 702 across the Internet 712 or another suitable communications network or combination of networks.

Integrated business system 702, which may be hosted by a dedicated third party, may include an integrated business server 714 and a web interface server 716, coupled as shown in FIG. 7. It is to be appreciated that either or both of the integrated business server 714 and the web interface server 716 may be implemented on one or more different hardware systems and components, even though represented as singular units in FIG. 7.

In a typical example in which system 702 is operated by a third party for the benefit of multiple account owners/tenants, each of whom is operating a business, integrated business server 714 comprises an ERP module 718 and further comprises a CRM module 720. In many cases, it will be desirable for the ERP module 718 to share methods, libraries, databases, subroutines, variables, etc., with CRM module 720, and indeed ERP module 718 may be intertwined with CRM module 720 into an integrated Business Data Processing Platform (which may be single tenant, but is typically multi-tenant).

The ERP module 718 may include, but is not limited to, a finance and accounting module, an order processing module, a time and billing module, an inventory management and distribution module, an employee management and payroll module, a calendaring and collaboration module, a reporting and security module, and other ERP-related modules. The CRM module 720 may include, but is not limited to, a sales force automation (SFA) module, a marketing automation module, a contact list module (not shown), a call center support module, a web-based customer support module, a reporting and security module, and other CRM-related modules. The integrated business server 714 (or multi-tenant data processing platform) further may provide other business functionalities including a web store/eCommerce module 722, a partner and vendor management module 724, and an integrated reporting module 730. An SCM (supply chain management) module 726 and PLM (product lifecycle management) module 728 may also be provided. Web interface server 716 is configured and adapted to interface with the integrated business server 714 to provide one or more web-based user interfaces to end users of the enterprise network 704.

The integrated business system shown in FIG. 7 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 8:
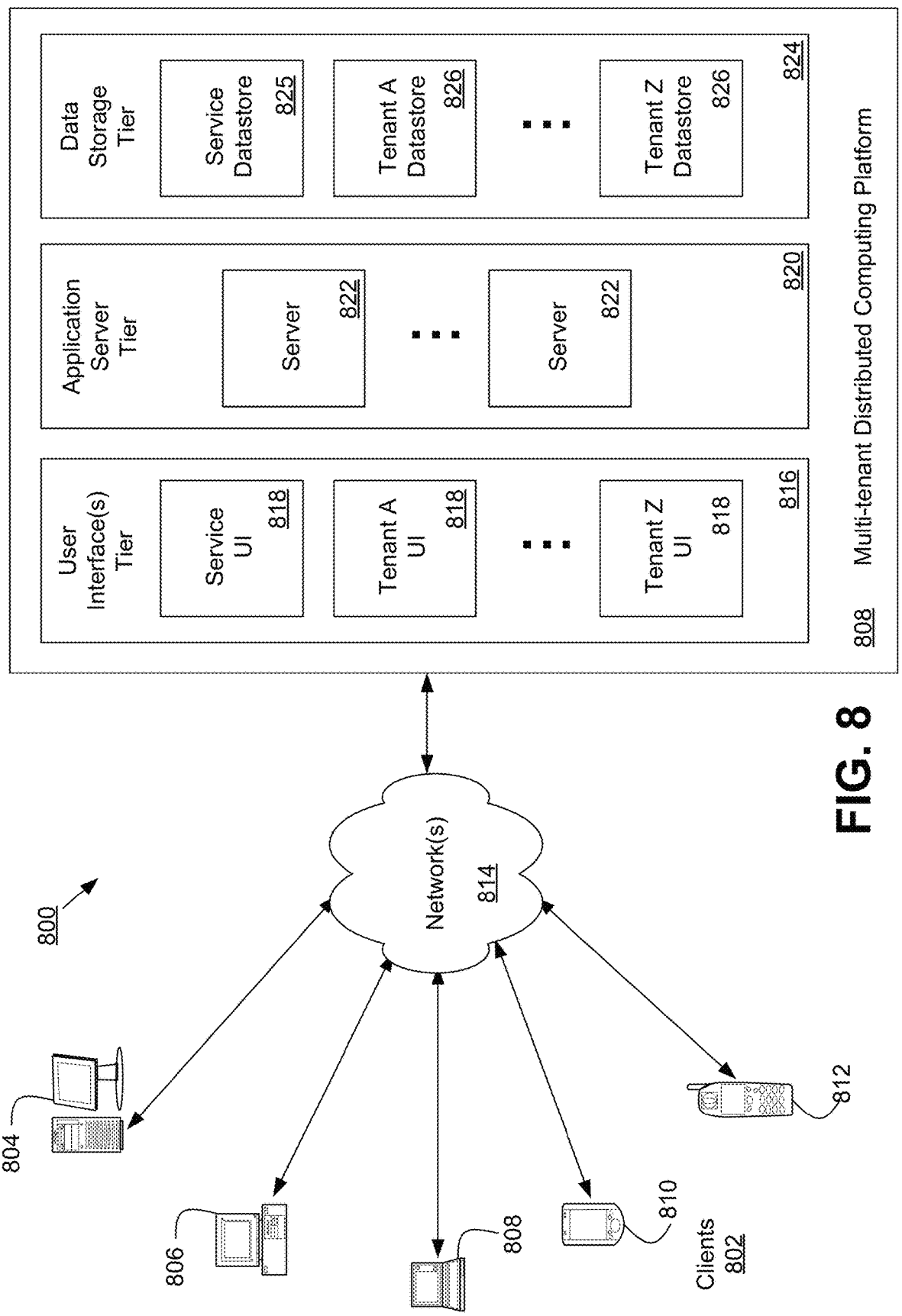
FIG. 8 illustrates an embodiment of a multi-tenant distributed computing service platform.

FIG. 8 is a diagram illustrating elements or components of an example operating environment 800 in which an embodiment of the invention may be implemented. As shown, a variety of clients 802 incorporating and/or incorporated into a variety of computing devices may communicate with a distributed computing service/platform 808 through one or more networks 814. For example, a client may incorporate and/or be incorporated into a client application (e.g., software) implemented at least in part by one or more of the computing devices. Examples of suitable computing devices include personal computers, server computers 804, desktop computers 806, laptop computers 808, notebook computers, tablet computers or personal digital assistants (PDAs) 810, smart phones 812, cell phones, and consumer electronic devices incorporating one or more computing device components, such as one or more electronic processors, microprocessors, central processing units (CPU), or controllers. Examples of suitable networks 814 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 808 may include multiple processing tiers, including a user interface tier 816, an application server tier 820, and a data storage tier 824. The user interface tier 816 may maintain multiple user interfaces 818, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 824 may include one or more data stores, which may include a Service Data store 825 and one or more Tenant Data stores 826.

Each tenant data store 826 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 808 may be multi-tenant and service platform 808 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 822 that are part of the platform's Application Server Tier 820.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 808 of FIG.

8(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 822 that are part of the platform's Application Server Tier 820.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 808 of FIG. 8).

As noted with regards to FIG. 7, the integrated business system shown in FIG. 8 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer causes the processor to:
    associate one or more streams of time series data to a group of time series data;
    assign the group of time series data to an access control container;
    define an access policy specifying access control rules for authorizing different types of access to different time ranges of the one or more streams of the time series data associated with the group of time series data, wherein the different time ranges are determined by time stamps associated with a given stream of time series data;
    associate the access policy with the access control container;
    receive a request from a requestor to access the time series data of the group of time series data through the access control container; and
    execute the access control rules within the access policy to either deny the request or allow implementation of the request based on at least a time range of data being requested for access from the group of time series data.

2. The non-transitory computer-readable medium of claim 1, wherein the instructions comprise instructions to:
    receive metric and log data collected over time from multi-tenant computing services hosted by a cloud computing environment as the time series data, wherein the group of time series data is defined as a collection of metric and log data for which the access policy is to be implemented for access control to the collection of metric and log data on behalf of a tenant represented by the cloud computing environment as the access control container, wherein the group of time series data is generated using at least one of identifiers or metadata of the time series data using regular expressions for the identifiers or metadata by executing a function on the time series data.

3. The non-transitory computer-readable medium of claim 1, wherein the instructions to associate the one or more streams of time series data comprise instructions to:
    generate a mapping within a data structure that associates a group identifier of the group of time series data with a timestamp and a stream identifier of a stream of time series data.

4. The non-transitory computer-readable medium of claim 3, wherein the instructions comprise instructions to:
    utilize the mapping within the data structure to assign and enforce the access policy on the access control container for the one or more streams.

5. The non-transitory computer-readable medium of claim 1, wherein the instructions comprise instructions to:
    generate a mapping within a data structure that associates a stream identifier of a first stream from the one or more streams of time series data to one or more fields defining the first stream, wherein the one or more fields comprise a metric name of a type of metric received through the first stream, a namespace of a source providing the first stream, a tenant identifier of a tenant associated with the access control container, and a dimension used to tag metrics received through the first stream.

6. The non-transitory computer-readable medium of claim 1, wherein the instructions comprise instructions to:
    generate a mapping within a data structure that associates a group identifier of the group of time series data to fields defining the group of time series data, wherein the fields comprise a display name for the group of time series data and a description of the group of time series data.

7. The non-transitory computer-readable medium of claim 1, wherein the instructions to associate the one or more streams of time series data comprise instructions to:
    identify the one or more streams to associate with the group of time series data using a rule specifying what resources are to be monitored for metrics of time series data that will be made available through the group of time series data.

8. The non-transitory computer-readable medium of claim 1, wherein the access control container is associated with a tenancy of a multi-tenant computing service hosted by a cloud computing environment.

9. A non-transitory computer-readable medium storing computer-executable instructions that when executed by a processor of a computer causes the processor to:
    receive metric and log data collected over time from multi-tenant computing services hosted by a cloud computing environment as time series data, wherein the group is defined as a collection of metric and log data for which the access policy is to be implemented for access control to the collection of metric and log data on behalf of a tenant represented by the cloud computing environment as the access control container, wherein the group is generated using at least one of identifiers or metadata of the time series data using regular expressions for the identifiers or metadata by executing a function on the time series data;
    associate one or more streams of the time series data to a group;
    assign the group to an access control container;
    define an access policy specifying access control rules for authorizing access to the time series data associated with the group;
    associate the access policy with the access control container;
    receive a request from a requestor to access the time series data of the group through the access control container;
    execute the access control rules within the access policy to either deny the request or allow implementation of the request;
    generate a mapping within a data structure that associates a container identifier of the access control container to a timestamp and a group identifier of the group; and
    utilize the mapping within the data structure to assign and enforce the access policy on the access control container for time series data received through the one or more streams.

10. A computing system, comprising:
    a processor connected to memory; and
    a security module stored on a non-transitory computer readable medium and configured with instructions that when executed by the processor cause the processor to:
        associate one or more streams of time series data to a group of time series data;
        assign the group of time series data to an access control container;
        define an access policy specifying access control rules for authorizing different types of access to different time ranges of the one or more streams of the time series data associated with the group of time series data, wherein the different time ranges are determined by time stamps associated with a given stream of time series data;

associate the access policy with the access control container;

receive a request from a requestor to access the time series data of the group of time series data through the access control container; and execute the access control rules within the access policy to either deny the request or allow implementation of the request based on at least a time range of data being requested for access from the group of time series data.

11. The computing system of claim 10, wherein the instructions comprise instructions that cause the processor to:

execute the access control rules within the access policy to restrict read access to a first time range of the time series data in the group of time series data and allow read access for a second time range of the time series data in the group of time series data.

12. The computing system of claim 10, wherein the instructions comprise instructions that cause the processor to:

execute the access control rules within the access policy to restrict write access for a first time range of the time series data in the group of time series data and allow write access for a second time range of the time series data in the group of time series data.

13. The computing system of claim 10, wherein the instructions comprise instructions that cause the processor to:

execute the access control rules within the access policy to revoke write access to the time series data of the group of time series data.

14. The computing system of claim 10, wherein the instructions comprise instructions that cause the processor to:

execute the access control rules within the access policy to provide read access to time series data of the group of time series data having timestamps following creation of the group of time series data.

15. The computing system of claim 10, wherein the instructions comprise instructions that cause the processor to:

execute the access control rules within the access policy to provide read access to time series data of the group of time series data having timestamps following a time at which the access policy is defined to provide the read access.

16. A computer-implemented method, the computer-implemented method involving a computing device comprising a processor, and the computer-implemented method comprising:

associating, by the processor, one or more streams of time series data to a group of time series data;

assigning, by the processor, the group of time series data to an access control container;

defining, by the processor, an access policy specifying access control rules for authorizing different types of access to different time ranges of the one or more streams of the time series data associated with the group of time series data, wherein the different time ranges are determined by time stamps associated with a given stream of time series data;

associating, by the processor, the access policy with the access control container;

receiving, by the processor, a request from a requestor to access the time series data of the group of time series data through the access control container; and executing, by the processor, the access control rules within the access policy to either deny the request or allow implementation of the request based on at least a time range of data being requested for access from the group of time series data.

17. The computer-implemented method of claim 16, further comprising:

executing the access control rules within the access policy at a tenant level of a multi-tenant computing service hosted by a cloud computing environment, wherein the access policy is applied to one more tenants.

18. The computer-implemented method of claim 16, further comprising:

executing the access control rules within the access policy at a compartment level of a multi-tenant computing service hosted by a cloud computing environment, wherein a tenant is associated with one or more compartments.

19. The computer-implemented method of claim 18, further comprising:

remapping the access policy from a first compartment to a second compartment, wherein a first mapping of the access policy to the first compartment is retained for evaluating requests associated with the first compartment.

20. The computer-implemented method of claim 18, further comprising:

aggregating a first type of time series data with a second type of time series data to create an aggregate type of time series data;

associating the aggregate type of time series data with the access control container; and executing the access control rules within the access policy to utilize access control rules for authorizing access to the aggregate type of time series data.

\* \* \* \* \*